Dec. 24, 1963 A. F. CACELLA ETAL 3,115,384
METHOD OF MAKING ELASTIC POLYMETHANE THREAD
Filed March 26, 1962 2 Sheets-Sheet 1
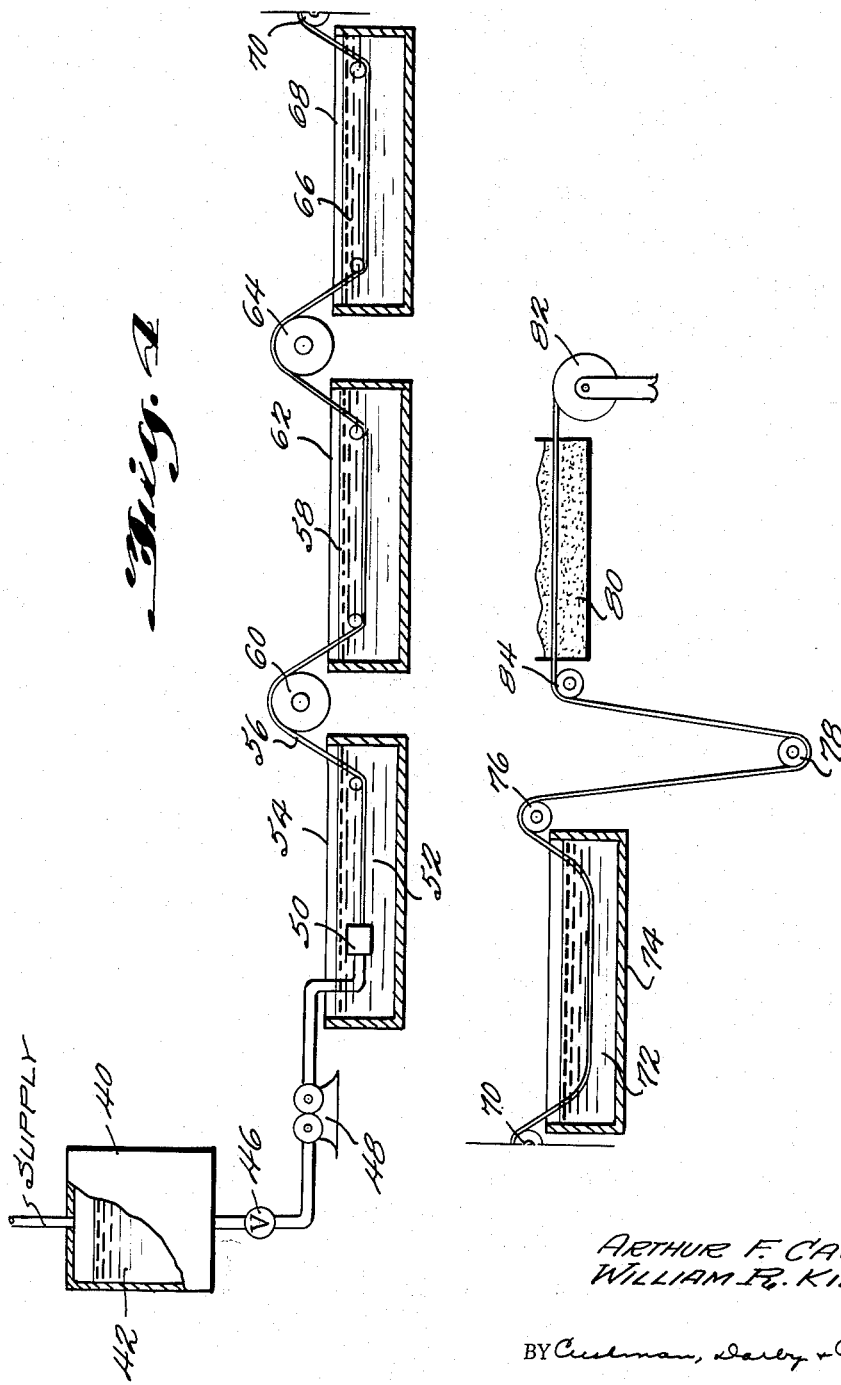
INVENTORS
ARTHUR F. CACELLA
WILLIAM R. KILLEN
BY Cushman, Darby & Cushman
ATTORNEYS Dec. 24, 1963  A. F. CACELLA ETAL  3,115,384
METHOD OF MAKING ELASTIC POLYMETHANE THREAD
Filed March 26, 1962  2 Sheets-Sheet 2
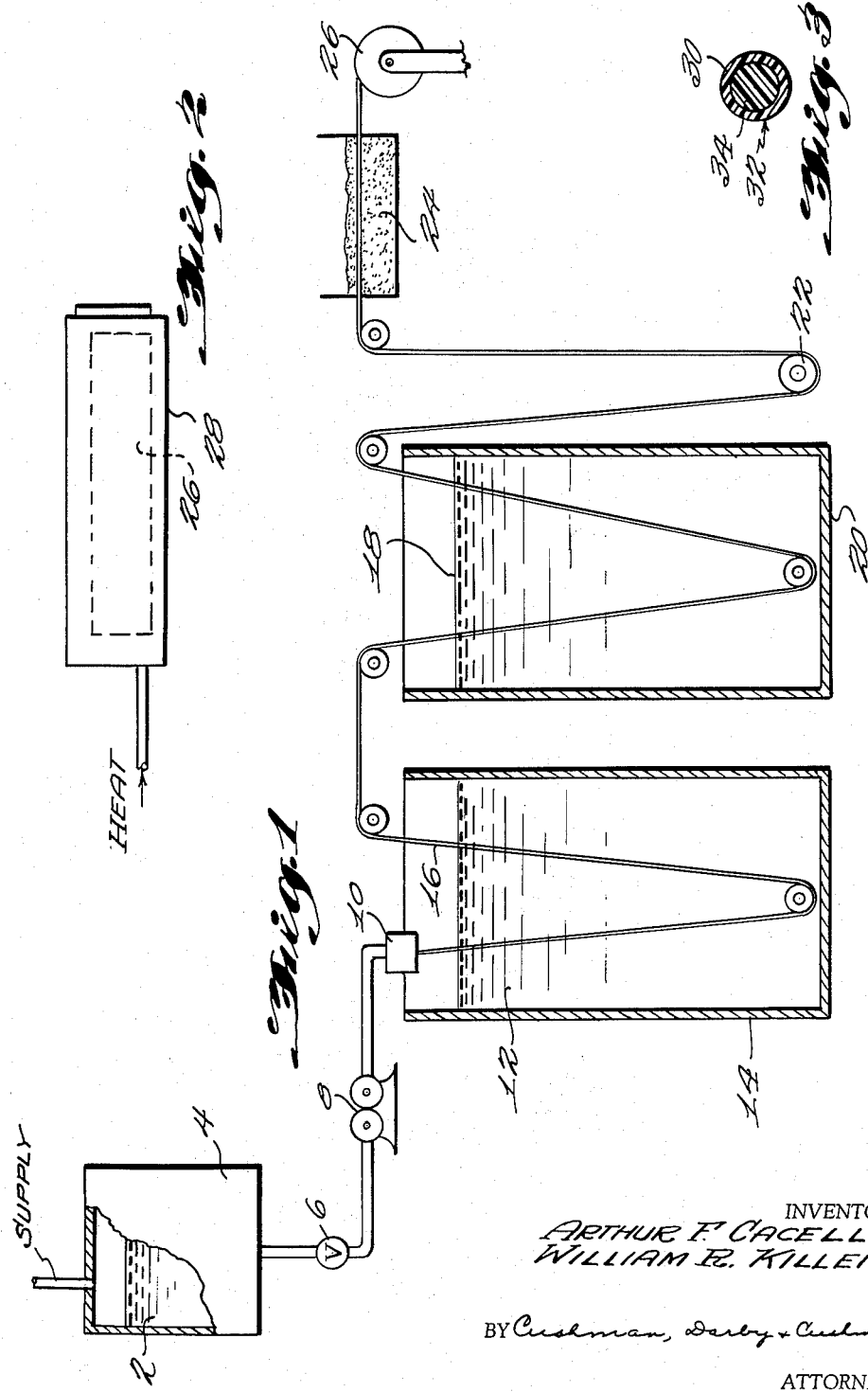
INVENTORS
ARTHUR F. CACELLA
WILLIAM R. KILLEN
BY Cushman, Darby & Cushman
ATTORNEYS

United States Patent Office 3,115,384
Patented Dec. 24, 1963

3,115,384
METHOD OF MAKING ELASTIC POLY-
METHANE THREAD
Arthur F. Cacella, Fall River, Mass., and William R.
Killen, Warwick, R.I., assignors to Globe Manufacturing Company, Fall River, Mass., a corporation of Massachusetts
Filed Mar. 26, 1962, Ser. No. 182,575
14 Claims. (Cl. 18—54)

This application is a continuation-in-part of application Serial No. 110,820, filed May 17, 1961.

The present invention relates to elastomeric thread prepared from polyurethanes and to the process for preparing such thread.

It has previously been proposed to make elastomeric thread from polyurethanes. Examples of such procedures are shown in Windemuth Patent 2,650,212, Brenschede Patent 2,755,266, Frankenburg et al. Patent 2,957,852, Urs Patent 3,009,764, Slovin Patent 3,009,765 and Kohrn et al. Patents 2,953,839 and 3,009,762. These prior proposals, however, are not the ultimate solution to the problem. Thus, Jung Patent 2,962,470 shows that Brenschede does not give a commercially attractive product. Kohrn describes a process wherein a liquid polyurethane prepolymer is forced through a fine nozzle into a dilute solution of a diprimary diamine which effects a rapid setting of the surface of the prepolymer to form a thread. The liquid core is subsequently set by forcing water therein under heat and pressure. The threads made by this process have the disadvantage of bad discoloration when exposed to ultraviolet radiation, e.g., in sunlight. Also, in the Kohrn process there is the need to employ hot water under pressure to penetrate the skin and to prevent the carbon dioxide formed from blistering the thread.

There is also available polyurethane thread under the trademark Lycra. Such thread has the disadvantage of too great a permanent set and lack of resistance to chlorine bleach. Since the housewife frequently employs chlorine bleaches in washing clothes, this is a severe limitation on the acceptance of such threads by the industry.

It is an object of the present invention to prepare an improved polyurethane thread.

Another object is to prepare a polyurethane thread having good resistance to chlorine bleaching.

An additional object is to prepare a polyurethane thread having good resistance to deterioration under heating.

A further object is to prepare a polyurethane thread having a reduced permanent set.

Yet another object is to provide an elastic polymer/polyurethane thread with high elongation, e.g., above 350%, good recovery properties and high resistance to heat oxidation and ultraviolet light degradation.

A still further object is to prepare polyurethane threads having not only more uniform gauge but also more uniform properties in general.

An additional object is to develop a process which permits more processing variations with consequent variations in properties of the polyurethane thread formed.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the objects can be accomplished by spinning a liquid prepolymer which is a reaction product of a polymer having terminal alcoholic hydroxyl groups with a diisocyanate, preferably an aromatic diisocyanate, through a fine nozzle, or spinnerette, into a solution in a hydroxy solvent containing at least 50% of an amine, preferably an aliphatic amine having at least two primary amino groups. This rapidly sets the surface of the liquid prepolymer, so that it can be handled as a thread. This thread, which is actually a fluid core surrounded by a solid skin, is subsequently cured with heat to obtain a completely solid strong, elastic thread having an unusual combination of desirable physical and chemical properties. The almost instantaneous skin formation prevents diffusion of the amine into the liquid core. If the thread is broken, liquid can be squeezed out proving that the core is liquid. There is no need for a hot water curing treatment and blister formation is avoided.

The broad procedure just described has the disadvantage that it is not possible to immerse the nozzle in a hot diamine bath without back-diffusion of diamine which clogs the nozzle. Immersion of the nozzle was found to be possible in diamine baths at 90° F. (32° C.) but the resulting thread properties are relatively poor.

It has been found, however, that a prepolymer jet stream initially surface reacted in a relatively cold diamine bath and then subsequently passed through a hot diamine bath can be processed as usual to produce an elastomeric thread with superior properties. Thus, the thread has a more uniform gauge and exhibits more uniform properties in general. Additionally, such a dual diamine bath system permits the immersion of the spinning nozzle under the reaction bath surface and permits more processing variations.

The function of the first aqueous diamine bath is to set the surface of the prepolymer stream so that it can be handled as a thread without clogging the spinning nozzle. The function of the second bath appears to be to set the internal polymer chain structure in the proper configuration required for desirable chemical and physical properties.

In the drawings FIGURE 1 illustrates in diagrammatic fashion one method of carrying out the invention;

FIGURE 2 is a view of the drying chamber employed to complete the process shown in FIGURE 1;

FIGURE 3 is a cross-sectional view of a thread made in accordance with the invention; and FIGURE 4 is a diagrammatic illustration of the preferred procedure employing two aqueous diamine reaction baths.

The liquid polyurethane prepolymer employed in the invention is typically derived from a polymer of molecular weight from 300 and up and generally about 1000, preferably 1500 to 5000, having terminal alcoholic hydroxyl groups. Such polymer can be a chain extended polyester made from a glycol, preferably a mixture of ethylene and propylene glycols, and a saturated organic dicarboxylic acid, preferably adipic acid. Usually, the glycol contains 2 to 20 carbon atoms. Typical examples of such glycols include ethylene glycol, propylene glycol, trimethylene glycol, 1,4-butylene glycol, 1,6-hexanediol, 1,4-butenediol, neopentyl glycol, diethylene glycol, thiodiglycol, 2,2'-dimethyl-1,3-propylene glycol, etc. The acid usually contains 4 to 20 carbon atoms. Typical examples include succinic acid, maleic acid, dihydromuconic acid, thiodipropionic acid, adipic acid, methyl adipic acid, glutaric acid, dimerized linoleic acid, sebacic acid, suberic acid, phthalic acid, and terephthalic acid. To some extent hydroxycarboxylic acids or their lactones can be used, e.g., caprolactone, to aid in forming the polyesters. As stated, mixtures of various dibasic acids and glycols can be used to form mixed esters.

An excess of the glycol over the acid is used in preparing the polyesters so that the resulting polyester contains terminal hydroxyl groups. Usually such an amount of glycol is used as to give a polyester having a hydroxyl number of 20 to 225 and preferably 36 to 75, and a low acid value, e.g., less than 6 and preferably less than 1. The molecular weight of the polyester usually ranges from 500 to 5000 and preferably 1500 to 3000. In general, the most suitable polyesters are chiefly linear with melting point levels of 90° C. or lower and preferably not over 60° C. Less suitably natural polyesters can be used, e.g., castor oil, as well as blown drying oils such as blow tung oil, linseed oil and soya oil.

Other examples of suitable polyesters for use in preparing the prepolymer are polyethylene adipate, polyethylene adipate-phthalate and polyneopentyl sebacate. Small amounts of trialcohols such as trimethylolpropane or trimethylolethane may be included in preparing the glycoldicarboxylic acid polyesters and such modified forms of polyester are included within the term polyester as used herein.

As an alternative to the polyesters there may be used for reaction with the polyisocyanate one or more elastomer yielding polyethers. Such polyethers are typically anhydrous chain extended polyethers possessing ether linkage separated by hydrocarbon chains either alkyl or aryl in nature. The ether should also contain terminal groups reactive to isocyanate, such as alcoholic hydroxyl groups. Such polyethers may be linear or branched. Usually, the polyethers are chiefly linear with a melting point of not over 90° C., preferably not over 60° C. The molecular weight may range from 500 to 5000, hydroxyl number of 225 to 22, but preferably is within the range of 750 to 3,500 (hydroxyl number of 150 to 45). Preferred polyethers have the formula $H(OR)_nOH$ where R is a lower alkylene group (2 to 6 carbon atoms) and $n$ is an integer so that the molecular weight falls within the range specified. Examples of polyethers are polyethylene glycol, polypopylene glycol, mixed polyethylene glycol-polypropylene glycol, polytetramethylene glycol (e.g., of 1000 molecular weight).

A portion of the polyester or polyether can be replaced by a tris polypropylene glycol phosphite such as tris (dipropylene glycol) phosphite or tris (polypropylene glycol 2025) phosphite as shown in Friedman Patent 3,009,939. The phosphite not only serves as a reactant but also imparts improved heat stability to the polyurethane as well as improved dyeing properties.

Polyethers not only can be used in place of the polyesters but can be used in conjunction therewith. Examples of such compounds are polydiethylene glycol adipate and polytriethylene glycol adipate. Further examples of polyesters and polyethers which are suitable are set forth in Kohrn Patent 2,953,839 and the patents cited therein in column 2, lines 56–68.

The polyester or polyether (including polyether-ester) is reacted or "capped" with a diisocyanate, preferably an aromatic diisocyanate, using a considerable molar excess, commonly from a 20 to a 250%, and preferably from a 50% to a 150% molar excess of the amount of diisocyanate required to react with all of the alcoholic hydroxy groups furnished by the polyester or polyether. The reaction is frequently effected by mixing the polyester or polyether with the diisocyanate either at room temperature, or at a moderately elevated temperature, e.g., 70 to 150° C., to form an uncured liquid prepolymer which is soluble in methyl ethyl ketone. The prepolymer is essentially a linear polyurethane having terminal isocyanate groups. The reaction is preferably carried out at 90 to 100° C.

Representative of the preferred aromatic diisocyanates that may be mentioned, by way of non-limiting examples are m- and p-phenylene diisocyanate, tolylene diisocyanate (65% 2,4 and 35% 2,6), p,p'-diphenyl diisocyanate, 1,5-naphthalene diisocyanate, p,p'-diphenyl-methane diisocyanate, 3,3'-bitolylene-4,4'-diisocyanate, 2,4-tolylene diisocyanate dimer, dianisidine diisocyanate, 4-chloro-1,3-phenylene diisocyanate. Aliphatic and cycloaliphatic diisocyanates can also be used such as 1,4-tetramethylene diisocyanate, 1,6-hexamethylene diisocyanate, 1,10-decamethylene diisocyanate, 1,4-cyclohexylene diisocyanate, 4,4'-methylene-bis (cyclohexylisocyanate) and 1,5-tetrahydronaphthalene diisocyanate. Other diisocyanates can be employed including those set forth in the Kohrn patent, as well as those mentioned in the patents set forth in Kohrn. The preferred diisocyanate is tolylene diisocyanate.

The invention contemplates the conversion of the liquid polyurethane prepolymer into a fine stream and thereafter converting the stream into a solid thread by a two-stage curing process. The first setting or curing of the outside surface only of the extruded stream of liquid prepolymer is by reaction with a diprimary amine mixed with a hydroxyl containing solvent, the amine being from 50 to 97%, preferably 80 to 95% of the total of diprimary amine and solvent. (Unless otherwise indicated, all parts and percentages in the specification and claims are by weight.) As suitable amines there can be used ethylene diamine, hexamethylene diamine, diethylene triamine, tetraethylene pentamine, 1,4-diaminocyclohexane, p-phenylenediamine, 3,3'-diaminodipropyl ether, diaminodibutyl sulfide, propylene diamine. The amines have the formula $H_2N—A—NH_2$, where A is a divalent organic radical in which the terminal atoms are carbon, and which is preferably devoid of groups reactive with isocyanate. The preferred diamine is ethylene diamine.

The preferred hydroxyl compound is water, although there can be used ethylene glycol, 1,4-butanediol, 1,3-butylene glycol, propylene glycol, glycerine, hexanetriol, ethyl alcohol, etc. The hydroxyl containing compounds are diluents for the diamine. It is critical that not over 50% of hydroxyl containing compound be employed since when larger amounts of this material are employed in the reaction the thread obtained is not only very weak but is also difficult to coagulate.

When a single diamine bath is employed, the treatment of the urethane prepolymer with the diamine can be carried out at room temperature or elevated temperatures (e.g., 35 to 100° C.). Preferably, the bath temperature is about 90 to 95° C. The surface of the liquid prepolymer stream, as it emerges from the extruder and passes into the diamine bath is quickly converted into a solid condition, thus forming an encasement or skin for the central fluid portion of the stream. The treatment with the diamine bath can be extremely short, e.g., 0.01 second, to 1 minute, or even much longer. The almost instantaneous skin formation prevents further diffusion of the diamine into the core.

Utilizing the preferred procedure employing two aqueous diamine baths the first bath is a cold bath, generally from about 90 to 135° F. (32 to 57° C.), and the second bath is a hot bath, generally from 150° F. (66° C.) to the boiling point.

There will be some variation in the temperature of the bath depending upon the particular prepolymer employed. With the prepolymer employed in Examples 7 to 9, the cold diamine bath temperature could range from 90 to 115° F., preferably about 100° F. The hot diamine bath temperature for the resin is preferably about 180° F., but fairly rapid treatment can be obtained with a hot bath temperature as low as 160° F.

As a general rule, the hot diamine bath temperature should be at least 35° F. (about 20° C.) above the cold diamine bath temperature and preferably is at least 60° F. (33° C.) above the cold bath temperature. It has been observed that the higher the extrusion temperature required, the higher must be the temperature of the second bath.

Utilizing the two-bath procedure with the prepolymer of Examples 7 to 9, the range of ethylene diamine to water in the cold bath is preferably 70 to 80% ethylene diamine and 30 to 20% water. In the hot bath the preferred range is 75 to 85% ethylene diamine and 25 to 15% water.

The threads which are formed either by the one-bath technique or the preferred two diamine bath procedure are then cured, e.g., at 65 to 205° C., usually 80 to 150° C. for a time of 30 minutes to 30 hours, usually 1 to 18 hours, preferably at 90 to 120° C. for 1 to 2 hours. Temperatures as low as 37° C. can be used if the time of cure is long enough. The excess diisocyanate present in the core reacts internally to complete the cure. It should be noted that no curing agent need be present but instead heat alone is all that is necessary to cure the core.

The cured threads can be stretched 10, 50, 100, 200 or 400% their original length by running a second spool 10, 50, 100, 200 or 400% faster, respectively, than the first spool. The thus stretched fibers are then postcured at 65° C. with 93° C. to 150° C. being preferred. Postcuring can be as short as 30 minutes or as long as 30 hours, but usually is between 1 and 15 hours.

The polyester or polyether and diisocyanate mixture prior to spinning can be diluted with 0 to 20% of conventional urethane solvents, e.g., acetone, methyl ethyl ketone, dimethyl formamide, dimethyl acetamide, ethylene carbonate, propylene carbonate and dimethyl sulfoxide to reduce the viscosity and thus aid in the spinning.

A small amount of a chain extender, e.g., 0.25 to 2 parts per 100 parts of the prepolymer, can be added with the diisocyanate but such chain extenders are not essential. As examples of such chain extenders there can be mentioned, triisopropanolamine, 1,4-butanediol, triethanolamine, Quadrol (tetrakis N,N'-β-hydroxyethyl ethylene diamine), diethanolamine, etc.

Prior to spinning there can also be added pigments in an amount of 1 to 2%, e.g., 2% of titanium dioxide. There can also be added antioxidants, ultraviolet absorbents, heat stabilizers, etc. prior to spinning.

After spinning, and prior to curing the interior, the thread is usually passed through a talc box to coat the surface of the thread and eliminate the possibility of sticking to itself when it is taken upon a spool.

Unless otherwise indicated, all parts and percentages are based on 100 parts or 100% of the resin.

While not being limited as to theory, it is believed that the polyurethane threads thus prepared by a partial interfacial and bulk polymerization comprise (1) polymer segments prepared from polyester (or polyether) segments, which latter segments are capped with a molecular excess of diisocyanates and reacted with aliphatic primary diamines (2) biuret linkages obtained from subsequent reaction of the urea hydrogens with the excess diisocyanate and (3) allophanate linkages obtained from subsequent reaction of the urethane hydrogens with the excess diisocyanate.

*Example 1*

A commercial polyester resin of molecular weight 3700, hydroxyl number of about 35, and an acid number of about 0.6 (from ethylene glycol, propylene glycol, adipic acid and a small amount of a triol, probably trimethylolpropane) was mixed at a temperature of 100° C. for 1 hour with an excess of tolylene diisocyanate in the proportion of 100 parts polyester to 15 parts diisocyanate. A reaction occurred between the hydroxyl groups of the polyester and the diisocyanate groups to form a capped polymer intermediate characterized by the presence of unreacted isocyanate groups. This intermediate was a viscous liquid urethane prepolymer which was soluble in the common organic solvents for polyurethanes, e.g., acetone. To lower the viscosity to a fluidity suitable for ready pumping through fine nozzles or spinnerettes without excessive pressure, 5 parts of acetone were added to the liquid prepolymer at room temperature and mixed for an additional hour.

Referring to FIGURE 1 of the drawing, a quantity of the liquid prepolymer mixture 2 was placed in a supply tank 4 connected through valve 6 to a pump 8 which in turn fed the nozzle 10 suspended just above the surface of a bath 12 containing an 80 to 20 ratio of ethylene diamine to water held at 93° C. in tank 14. The nozzle hole diameter was 0.02 inch. The pump setting was such that a 100 gauge thread was produced at 60 ft./min. take up speed.

The surface of the extruded liquid set to a solid condition almost immediately in the bath, and the resulting thread 16 (which still had a fluid core) was conveyed through the bath for a distance of about 6 feet at a speed of 58 ft./min. The thread then passed out of the reaction bath into a water bath 18 in tank 20 at room temperature to remove unreacted diamine, and finally over steam heated rolls 22 to dry the thread and through a talc box 24 to cover any tackiness and onto a take up spool 26 at 60 ft./min. The fluid core of the thread was then substantially completely cured as shown in FIGURE 2 by heating the spool 26 in an air oven 28 at 121° C. (250° F.) for 2 hours. The diameter of the thread was 0.010 inch. Its physical properties were:

|  | Uncured | Cured 2 hrs. at 121° C. |
|---|---|---|
| Tensile strength, p.s.i. | 6,600 | 8,600 |
| Elongation, percent | 725 | 775 |
| Permanent set, percent | 23 | 19 |

The resulting thread is characterized by a unique structure in that the outer skin or layer 30 (FIGURE 3) of the finished thread is a polyurethane material (polyurea material) cured essentially by chemical reaction with a rapid curing agent, ethylene diamine, while the central area or core 34 of the polyurethane appears to be a partial polyurea material that has been cured essentially by chemical reaction with excess diisocyanate to form biuret and allophanate cross links. Attempts to spin the polyurethane prepolymer of this example through a 5 to 95 ethylene diamine to water bath or through a 100% ethylene diamine bath were unsuccessful.

The threads formed in Example 1 did not show any blistering and did not discolor upon heat aging. The thread was also resistant to chlorine bleach, showing no adverse effect.

*Example 2*

A prepolymer was prepared by reacting 100 parts of the commercial polyester of Example 1 with 15 parts tolylene diisocyanate at 100° C. for 5 minutes and then adding 0.5 part of triisopropanolamine and reacting at 100° C. for an additional 60 minutes, then cooling to room temperature and mixing in 5% acetone for an additional hour. The resulting liquid prepolymer was then spun through a nozzle of 0.02 inch diameter through a 95 to 5 ethylene diamine to water bath at 60° C. to form a thread which was further processed as in Example 1. The thread after curing for 3 hours at 250° F. (121° C.) exhibited the following properties:

Tensile strength, p.s.i. _____ 9500
Elongation, percent _____ 600–650
Permanent set, percent _____ 12

Exposure to ultraviolet in standard Fadeometer tests led to slight discoloration. Ozone and heat resistance were especially high in comparison to polyurea threads made in accordance with Frankenburg Patent 2,957,852.

*Example 3*

Example 1 was repeated except that the prepolymer was spun into a bath containing 70 parts ethylene diamine, 30 parts glycerine and 10 parts water.

*Example 4*

The process of Example 2 was repeated with the modification that the urethane prepolymer was spun into a bath composed of 80 parts ethylene diamine and 20 parts water and the thread was cured in the oven for 4 hours at 200° F. (93° C.), stretched 50% and cured 1 hour again at 200° F. (93° C.). A second sample of the thread after the initial oven curing was stretched 100% and cured 1 hour at 200° F. (93° C.). The physical properties of that thread were as follows:

|  | Uncured | Cured | Cured 50% Stretch, further cured | Cured, 100% Stretch, further cured |
|---|---|---|---|---|
| Tensile strength, p.s.i. | 6,000 | 8,800 | 9,500 | 10,500 |
| Elongation, percent | 600 | 725 | 625 | 500-550 |
| Permanent set, percent | 17 | 20 | 8 | 10 |
| Drop modulus, inches |  | 6 | 3.75 |  |
| 300% modulus, p.s.i. |  | 625 | 950 | 1,800 |

*Example 5*

The process of Example 4 was repeated except that the triisopropanolamine added to the diisocyanate-polyester was replaced by 0.5 part of 1,4-butanediol. The properties of the thread were:

|  | Uncured | Cured 2 hours at 250° F. |
|---|---|---|
| Tensile strength, p.s.i. | 7,000 | 9,000 |
| Elongation, percent | 625 | 775 |
| Permanent set, percent | 17 | 18 |
| 300% modulus, p.s.i. |  | 600 |

*Example 6*

A prepolymer was prepared by reacting 3 parts of a commercial hydroxyl terminated polyester (a polyethylene glycol adipate having a molecular weight of 1800, hydroxyl number of 60 and acid number of 0.3) with 1 part of tolylene diisocyanate for 2 hours at 100° C. to obtain chain extension to form a hydroxyl terminated polyurethane. The polyurethane was then further reacted with 25% excess tolylene diisocyanate at 100° C. for 2 hours to form an isocyanate capped polyurethane prepolymer which was spun into a bath of 80 parts ethylene diamine and 20 parts water as in Example 4. The temperature of the prepolymer and the reaction bath during the spinning was 60° C. The thread was processed as in Example 4, i.e., it was washed, dried and cured 2 hours at 250° F. (121° C.). The cured thread had the following properties:

Tensile strength, p.s.i. _____ 4400
Elongation, percent _____ 575
Permanent set, percent _____ 30

Examples 7 to 9 illustrate the preferred form of the invention.

*Example 7*

A commercial polyester resin of molecular weight 3700, hydroxyl number of about 36, and an acid number of about 0.2 (from ethylene glycol, propylene glycol, adipic acid and a small amount of trimethylolpropane) was mixed at a temperature of 200° F. (93° C.) for three hours with an excess of tolylene diisocyanate in the proportion of 100 parts of polyester to 16.8 parts diisocyanate. A reaction occurred between the hydroxyl groups of the polyester and the diisocyanate to form a capped polymer intermediate characterized by the presence of unreacted isocyanate groups (free NCO content about 4.0%).

Referring to FIGURE 4 of the drawing, a quantity of the liquid prepolymer mixture 42 was placed in a supply tank 40 connected through valve 46 to a pump 48 which in turn fed the nozzle 50 immersed in a cold bath 52 containing a 72 to 28 ratio of ethylene diamine to water held at 90° F. in tank 54. The nozzle hole diameter was 0.024 inch. The pump setting was such that a 125 gauge thread was produced at 110 ft./min. take up speed.

The surface of the extruded liquid set to a solid condition almost immediately in the bath, and the resulting thread 56 (which still had a liquid core) was conveyed through the bath 52 for a distance of about 24 inches at a roll 60 speed of 41 ft./min. and into a second and hot bath 58 containing an 81 to 19 ratio of ethylene diamine to water held at 180° F. in tank 62. The thread was conveyed through the second diamine bath 58 for a distance of about 36 inches at a roll 64 speed of 61 ft./min. and then passed out of this reaction bath into successive water baths 66 and 72 in tanks 68 and 74 with roll 70 therebetween. The water baths were maintained at a temperature of 125° F. and the thread passed through these baths at a speed of 66 ft./min. The water baths served to remove unreacted ethylene diamine. From the second water (or rinse) bath 26 the thread passed over roll 76 under roll 78 at a speed of 95 ft./min. and over roll 84. Rolls 76 and 78 were steam heated to dry the thread. Next, the thread was passed through talc box 80 to cover any tackiness and then went onto a take up spool 82 at 100 ft./min. The fluid core of the thread was then substantially completely cured by heating the spool 82 at 250° F. (121° C.) for 2 hours in an oven such as air oven 28 (FIGURE 2). The properties of the cured thread were:

Tensile strength, p.s.i. _____ 7500-8000
Elongation, percent _____ 600-625
300% modulus, p.s.i. _____ 1500-1800
Permanent set, percent _____ 15-18
Weight/ft., mg _____ 14-16

The physical properties could be modified considerably by variations in processing tensions during spinning. By stretching the uncured thread to various levels before take up, different degrees of molecular orientation were obtained. This orientation is set during cure and results in specific reproducible properties under the same spinning conditions. The variations in physical properties which can be obtained by varying the spinning conditions are illustrated in Examples 8 and 9.

*Example 8*

The same prepolymer was prepared as in Example 7 containing 4.0% free isocyanate groups as a first sample. A second prepolymer was prepared in the same way from 100 parts of the polyester resin used in Example 7 and 14.3 parts of tolylene diisocyanate to yield a product with about 3.0 free isocyanate groups as a second sample. Both samples were spun and further treated under the same conditions as in Example 7 except that the speeds of some of the rolls were altered as follows:

Ft./min.
Roll 60 _____ 45
Roll 64 _____ 60
Roll 78 _____ 95
Take up spool 82 _____ 100

The properties of the cured threads obtained were as follows:

|  | Sample 1 | Sample 2 |
|---|---|---|
| Tensile strength, p.s.i. | 7800 | 7900 |
| Elongation, percent | 625 | 700 |
| Modulus, p.s.i. | 1,380 | 720-792 |
| Weight/ft. | 22.0 | 21.3 |

The high modulus thread of Sample 1 was useful for women's undergarments and the low modulus thread of Sample 2 was useful in making men's socks.

*Example 9*

The same prepolymer was prepared as in Example 8, Sample 2 (i.e., from 100 parts of the polyester resin and 14.3 parts of the tolylene diisocyanate). The product was spun and further treated under the same conditions as in Example 7 except that the speeds of some of the rolls were altered as indicated to give the properties set forth.

|  | Sample 3 | Sample 4 | Sample 5 |
| --- | --- | --- | --- |
| Roll 60 ft./min | 41 | 45 | 45 |
| Roll 64 ft./min | 61 | 60 | 60 |
| Roll 78 ft./min | 90 | 90 | 90 |
| Take up spool 82 ft./min | 150 | 150 | 100 |
| Tensile strength, p.s.i | 8,800 | 7,800 | 8,100 |
| Elongation, percent | 525 | 500 | 700 |
| 300% Modulus, p.s.i | 1,990 | 1,360 | 655 |
| Weight/ft. mg | 14.0 | 14.3 | 19.8 |

Multifilament threads can be spun with less tendency of the filaments to coalesce when the spinning nozzles are immersed below the surface of the reaction bath.

We claim:

1. A method of making an elastic thread comprising the steps of providing an anhydrous liquid polyurethane prepolymer which is a reaction product of a polymer having terminal hydroxyl groups selected from the group consisting of polyesters and polyethers with an excess of an aromatic diisocyanate, said diisocyanate serving as a setting agent, extruding said prepolymer in the form of a filament into a setting bath of 50 to 97% of an aliphatic amine having two primary amine groups and 3 to 50% of a hydroxyl containing solvent therefor to effect a setting of the external surface only of the extruded material to a solid state while the interior of the filament remains fluid and thereafter setting the interior of the filament to a solid, nonporous state under anhydrous conditions at a temperature between 37° C. and the melting point of the polyurethane.

2. A method according to claim 1 wherein the interior of the filament is set at atmospheric pressure.

3. A method according to claim 1 wherein the interior of the filament is set at a temperature of 65–150° C. and the diisocyanate is the sole setting agent.

4. A method according to claim 1 wherein the interior of the filament is set at a temperature of 65–150° C. and the setting agent consists of the diisocyanate and an organic chain extender having at least two groups reactive with isocyanate groups.

5. A method according to claim 1 wherein the interior of the filament is set at a temperature of 80–150° C., the polymer is an ethylene-propylene adipate, the aromatic diisocyanate is tolylene diisocyanate, the aliphatic amine is ethylene diamine and the hydroxyl containing solvent is water and the aliphatic amine is 50 to 95% of the amine-water bath.

6. A method according to claim 5 wherein the interior of the filament is set at atmospheric pressure.

7. A method according to claim 1 wherein the hydroxyl containing solvent is water.

8. A method of making an elastic thread comprising in combination the steps of providing a liquid polyurethane prepolymer which is a reaction product of a polymer having terminal hydroxyl groups selected from the group consisting of polyesters and polyethers with an excess of an organic diisocyanate, extruding said prepolymer in the form of a filament into a cold bath having a temperature of not over 135° F. and containing 50 to 97% of an aliphatic amine having two primary amine groups and 3 to 50% of a hydroxyl containing solvent to effect a setting of the external surface only of the extruded material to a solid state while the interior of the filament remains fluid, then passing said filament into a hot bath of 50 to 97% of an aliphatic amine having two primary amine groups and 3 to 50% of a hydroxyl containing solvent therefor, said hot bath having a temperature of at least 150° F. and being at least 35° F. above the temperature of the cold bath and thereafter setting the interior of the filament to a solid, nonporous state.

9. A process according to claim 8 wherein the diisocyanate is an aromatic diisocyanate, the solvent in the cold bath is water and the solvent in the hot bath is water.

10. A method of making an elastic thread comprising in combination the steps of providing a liquid polyurethane prepolymer which is a reaction product of a polymer having terminal hydroxyl groups selected from the group consisting of polyesters and polyethers with an excess of an aromatic diisocyanate, extruding said prepolymer in the form of a filament into a cold bath having a temperature between about 85° F. and 135° F. and containing 50 to 97% of an aliphatic diprimary diamine and 3 to 50% of water to effect a setting of the external surface only of the extruded material to a solid state while the interior of the filament remains fluid, then passing said filament into a hot bath of 50 to 97% of an aliphatic diprimary diamine and 3 to 50% of water, said hot bath having a temperature between 150° F. and the boiling point of the bath and also being at least 60° F. above the temperature of the cold bath and thereafter setting the interior of the filament under anhydrous conditions to a solid, nonporous state.

11. A method according to claim 10 wherein the diamine is ethylene diamine, the cold bath contains 70 to 80% of the diamine, the hot bath contains 75 to 85% of the diamine.

12. A process according to claim 10 wherein the thread is stretched to a greater extent in the cold bath than in the hot bath.

13. A process according to claim 8 wherein the filament is formed by spinning beneath the surface of the cold bath.

14. A process according to claim 10 wherein the polymer is an ethylene-propylene adipate, the aromatic diisocyanate is tolylene diisocyanate, the diamine is ethylene diamine, the cold bath has a temperature of 90–115° F. and contains 70 to 80% ethylene diamine and 30 to 20% water, the hot bath has a temperature of 160 to 200° F., and contains 75 to 85% ethylene diamine and 25 to 15% water.

No references cited.